(12) United States Patent
Raichart

(10) Patent No.: US 9,050,631 B2
(45) Date of Patent: Jun. 9, 2015

(54) APPARATUS AND RELATED METHODS FOR EXTRACTING RESINS FROM CANNABIS

(71) Applicant: Cullen Raichart, San Diego, CA (US)

(72) Inventor: Cullen Raichart, San Diego, CA (US)

( * ) Notice: Subject to any disclaimer, the term of this patent is extended or adjusted under 35 U.S.C. 154(b) by 169 days.

(21) Appl. No.: 13/761,108

(22) Filed: Feb. 6, 2013

(65) Prior Publication Data

US 2014/0216989 A1    Aug. 7, 2014

(51) Int. Cl.
| | |
|---|---|
| B07B 1/02 | (2006.01) |
| B07B 1/28 | (2006.01) |
| B07B 1/22 | (2006.01) |
| B07B 1/26 | (2006.01) |
| C09F 1/00 | (2006.01) |

(52) U.S. Cl.
CPC . *B07B 1/288* (2013.01); *B07B 1/22* (2013.01); *B07B 1/26* (2013.01); *C09F 1/00* (2013.01)

(58) Field of Classification Search
CPC ................ B07B 1/02; B07B 1/12; B07B 1/28
USPC .......... 209/350, 364, 369, 370–373, 409, 412
See application file for complete search history.

(56) References Cited

U.S. PATENT DOCUMENTS

| | | | | |
|---|---|---|---|---|
| 60,539 | A | * | 12/1866 | Morse ........................... 209/364 |
| 104,671 | A | * | 6/1870 | Webb ............................ 209/286 |
| 182,283 | A | * | 9/1876 | Osborne ....................... 209/287 |
| 220,027 | A | * | 9/1879 | Losee et al. .................. 209/286 |
| 419,114 | A | * | 1/1890 | Crispell ........................ 209/286 |
| 871,929 | A | * | 11/1907 | Guerin .......................... 209/298 |
| 1,314,826 | A | * | 9/1919 | Matthes ........................ 209/370 |
| 3,729,096 | A | * | 4/1973 | Fitzner et al. ................. 209/664 |
| 6,158,591 | A | * | 12/2000 | Delp ............................... 209/17 |
| 2013/0220895 | A1 | * | 8/2013 | Tucker et al. ................. 209/235 |

* cited by examiner

*Primary Examiner* — Joseph C Rodriguez
(74) *Attorney, Agent, or Firm* — John K. Buche; Buche & Associates, P.C.

(57) ABSTRACT

Disclosed may be an apparatus and related methods for simply and inexpensively extracting the psychoactive resins of cannabis skuff. Further disclosed may be apparatus and related methods of extracting cannabis resins without the drawbacks of heretoforknown apparatus. Yet still disclosed is apparatus and methods for using more of a harvested cannabis plant. In a preferred embodiment, the apparatus comprises: a tumble box with a door with a plurality of screened traps; and, a motor for rotating the box around an axis, and, shaking the tumble box along the axis. The more specific aspects of the disclosed apparatus are further described with reference to the drawings.

11 Claims, 4 Drawing Sheets

APPARATUS AND RELATED METHODS FOR EXTRACTING RESINS FROM CANNABIS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This specification describes subject matter in the field of apparatus and related methods for extracting resins from cannabis.

2. Background of the Invention

Hashish, or "hash," is a consumable compress of purified psychoactive resins from a cannabis plant. The highest concentration of these resins is found in the buds of the plant, which are typically smoked and consumed for recreational or medicinal uses via inhalation. This said, around ten percent of the resins are found in leafs and stems, collectively "skuff," of the cannabis plant and said skuff is ordinarily discarded due to its unpleasantness as a smoked or eaten consumable. With cannabis use becoming socially acceptable and being legalized at state levels, it comes as no surprise that many are desirous of extracting the psychoactive resins from cannabis skuff so that the same may be recreationally or medicinally consumed.

Many ways exist for extracting the psychoactive cannabis resins. One popular method is known as flat screening. Flat screening is typically accomplished by manually rubbing skuff over a fine steel or silk screen placed over a mirror or glass. After contacting the skuff with the screen, the resins pass through the screen mesh for collection on the mirror or glass while the skuff remains on the screen. While flat screening is easily accomplished, the quality and amount of resins collected is dependent on the skill of the screener. As a result, flat screening frequently results in hash with contaminants or impurities.

Drum machines are another known way of extracting the psychoactive resins from cannabis plants. Basically, drum machines are comprised of a screen cylinder wherein skuff is placed in the screen cylinder while it is turned on its axis. As the screen cylinder turns, the resins fall through the mesh of the screen cylinder into a collection area. While drum machines may be automated, there may still be a certain level of skill required for extracting highly concentrated resins. Also, drum machines turn the skuff over the screen, rather than rubbing, so that more time is required to extract the resins by turning than by flat screening.

In view of the foregoing, a need exists for apparatus and related methods of extracting the psychoactive resins from cannabis skuff. More specifically, a need exists for apparatus and related methods of improved flat screening or drumming machines for removing resins from cannabis plants.

SUMMARY OF THE INVENTION

With the aforementioned need in mind, it is an object of this description to disclose a device for simply and inexpensively extracting the psychoactive resins of cannabis skuff. It is further an objective to disclose apparatus and related methods of extracting cannabis resins without the drawbacks of heretoforknown apparatus. Yet still, it is an objective to disclose apparatus and related methods of extracting cannabis resins so that more of a cannabis plant can be used for recreational or medicinal purposes. In a preferred embodiment, the apparatus comprises:
  (1) a tumble box with a plurality of screened traps; and,
  (2) a motor for
     a. rotating the box around an axis, or,
     b. shaking the tumble box along the axis.

In one mode of operation, skuff may be provided to within the tumble box, the motor may be energized so that the box rotates or shakes, wherein rotating and shaking the box passes resins through the screen traps, and wherein the resins may be extracted via opening the screened traps. After extraction, the resins may be compressed into hash.

BRIEF DESCRIPTION OF THE FIGURES

The manner in which these objectives and other desirable characteristics can be obtained is explained in the following description and attached figures in which.

DETAILED DESCRIPTION OF THE PREFERRED EMBODIMENTS

Disclosed may be an apparatus and related methods for simply and inexpensively extracting the psychoactive resins of cannabis skuff. Further disclosed may be apparatus and related methods of extracting cannabis resins without the drawbacks of heretoforknown apparatus. In a preferred embodiment, the apparatus comprises: a tumble box with a door plus a plurality of screened traps; and a motor for (i) rotating the box around an axis, and (ii) shaking the tumble box along the axis. The more specific aspects of the disclosed apparatus are further described with reference to the drawings.

Figure 1:
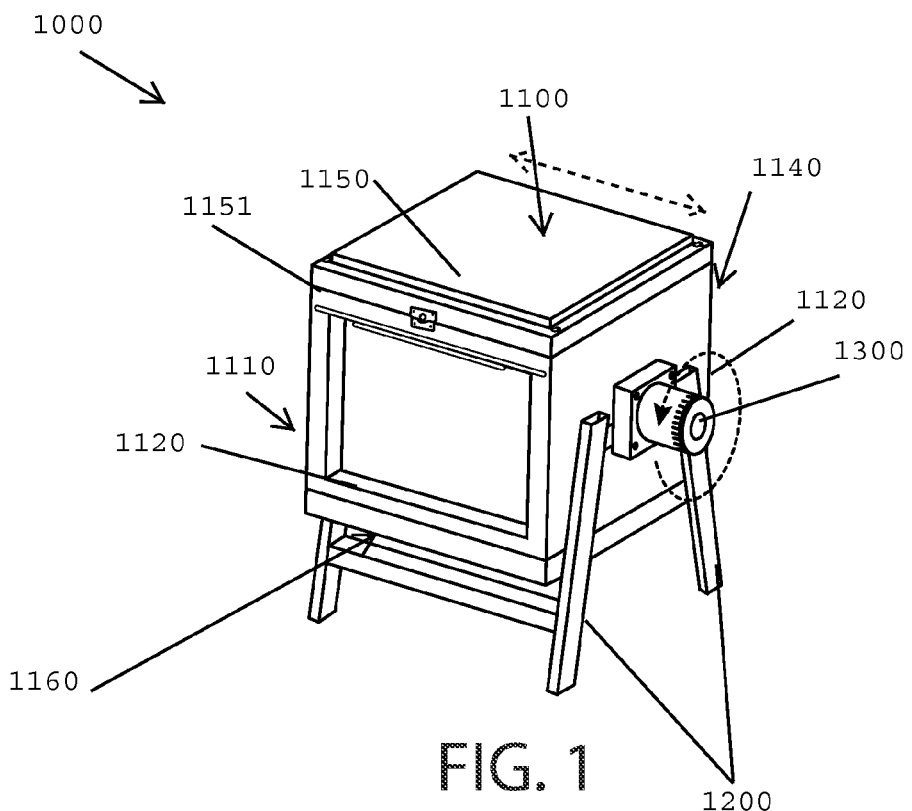
FIG. 1 is a perspective view the apparatus 1000.

FIG. 1 illustrates a perspective view of an apparatus 1000. As shown in FIG. 1, the apparatus is defined by: (1) a tumble box 1100; (2) a support stand 1200; and (3) a motor 1300. The tumble box 1100 is preferably defined by a box with six orthogonal sides, namely: a left side 1110, a right side 1120, a front side 1130, a back side 1140, a top side 1150, and a bottom side 1160. The left and right sides 1110, 1120 of the tumble box 1000 feature an axis that is mounted on the support stand 1200, which may be in the form of an A-frame. The axis on the left side 1110 rises in a bushing/bearing in the support stand 1200. The shaft on the right sides 1120 has a gear on and also rides in a bushing/bearing in the support stand 1200. Still referring to FIG. 1, a motor 1300 is mounted to support stand 1200. The drive shaft of the motor has a gear on it that meshes with the gear on the box's 1100 the axis of rotation on the right side 1120. Suitatably, the motor 1300 may be for spinning (at between twenty and forty revolutions per minute) or shaking the tumble box 1100 in the manner depicted by arrows in broken lines. In other words, an apparatus may be configured to spin, rotate, or spin and rotate. In one embodiment, the motor is designed to run on several power sources, including but not limited to a standard alternate current power source or a solar panel with a direct current inverter. The motor 1300 may be manually operated or a timer may suitably be provided to the motor to control the amount of time that the machine rotates.

Figure 2:
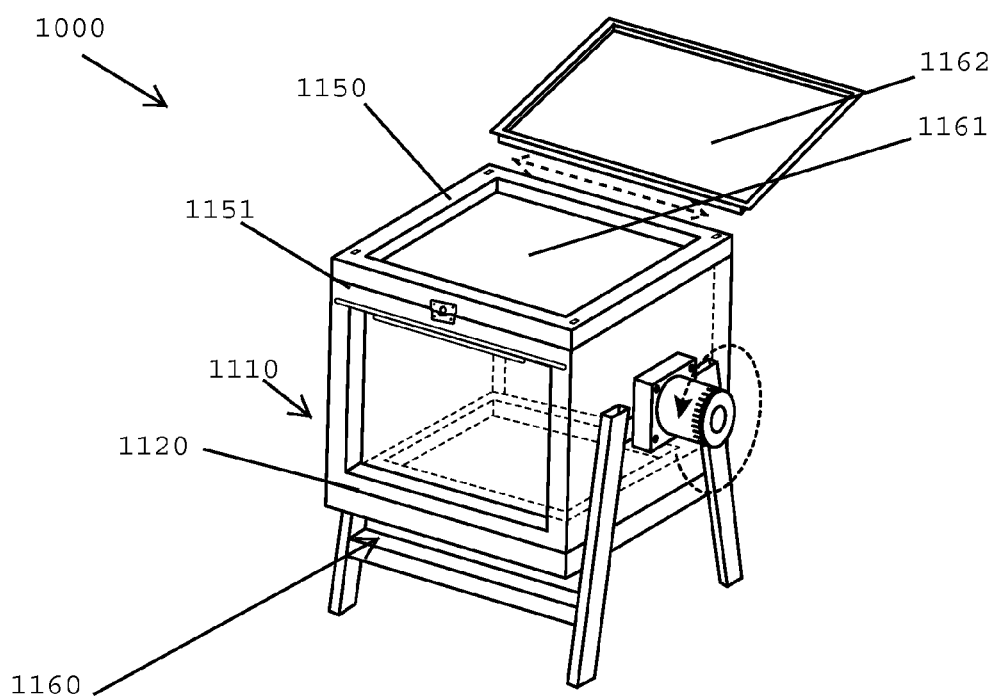
FIG. 2 is a perspective view the apparatus 1000 of FIG. 1 with an open door 1151.

FIG. 2 is another perspective of the apparatus 1000 depicted in FIG. 1. Referring to FIG. 2, the top side 1150 of the tumble box 1100 is preferably hinged so as to provide a door 1151 to the inside of the tumble box 1100. Suitably, the hinged door 1151 may be latched so that the same may be kept closed during operation of the apparatus 1000. In an alternate embodiment (not shown) the door may feature a door that snaps into place rather than one that is hinged. As shown in broken lines, the inside of the tumble box 1100 is preferably hollow. The front, bottom, back, and top sides of the tumble box 1100 are all defined by a screen trap 1160, which components are comprised a steel or silk screen (preferably in the xx micron to yy micron range) on the inside walls 1161 of the tumble box 1110, and collection pans on the outside wall 1162 of the tumble box 1100. The collection pans 1162 preferably attach to the outside walls of the tumble box 1100 via releasable clips. In one embodiment, the tumble box 1000 and its components are constructed of wood, metal or plastic.

Figure 3A:
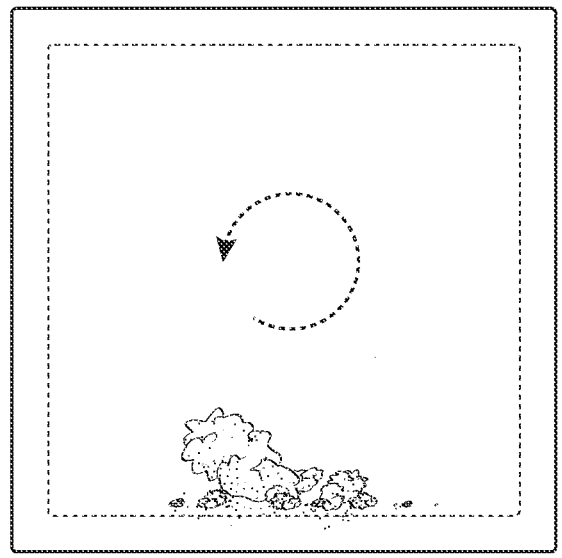
FIG. 3A is a cross section of the tumble box 1100 of the apparatus 1000 shown in FIGS. 1 and 2.
Figure 3B:
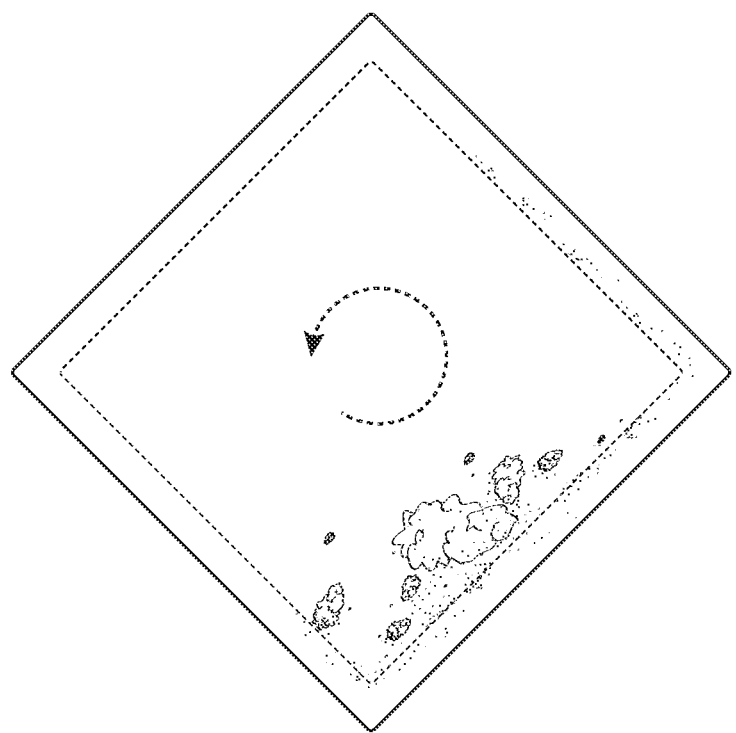
FIG. 3B is another cross section of the tumble box 1100 of the apparatus 1000 shown in FIGS. 1 and 2.
Figure 3C:
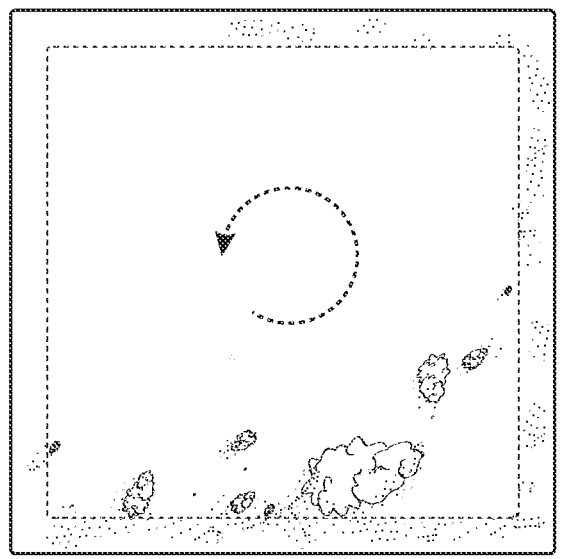
FIG. 3C is yet another cross section of the tumble box 1100 of the apparatus 1000 shown in FIGS. 1 and 2.
Figure 3D:
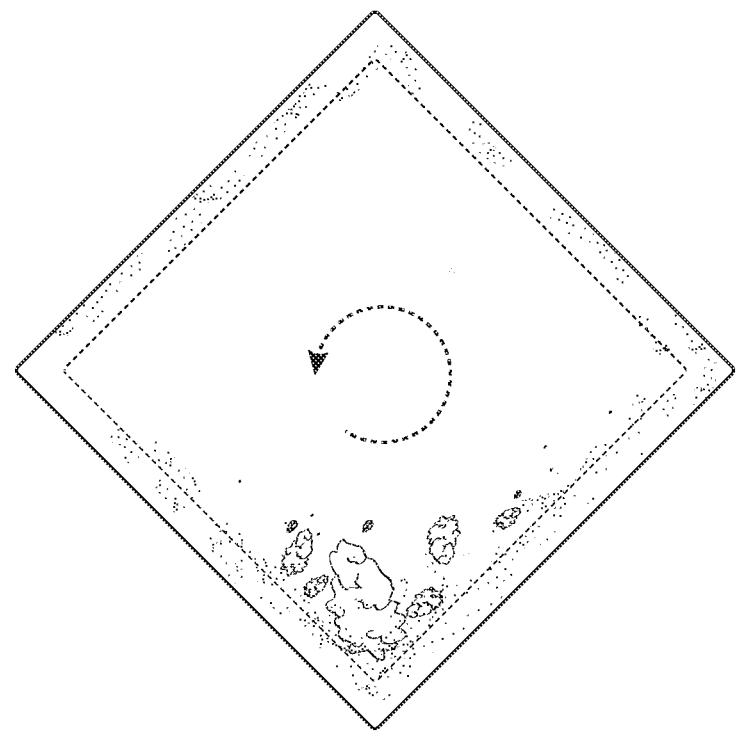
FIG. 3D is yet still and another cross section of the tumble box 1100 of the apparatus 1000 shown in FIGS. 1 and 2.

As set forth above, the disclosed apparatus may be used to extract resins from cannabis or other plants. FIGS. 3A through 3D illustrate how said resin extraction is accomplished. Referring first to FIG. 3A, which is a cross section of the tumble box 1100 shown in FIGS. 1 and 2, a load of skuff 2000 may be deposited within the tumble box via the door 1151. Suitably, skuff 2000 should be provided in the amount of one-quarter of the volume of the box 1100. As shown, the skuff comprises resin 2100 and waste product 2200. Without more, few resin nodules pass through the screens 1161 of the screen traps 1160. Referring now to FIG. 3B, which is a quarter turn of the cross-section tumble box 1100 in view of FIG. 3A, rotation of the box causes movement of the resin 2100 whereby some of the resin 2100 is disclocated from the waste product 2200 and passes through the screens in to one of the screen traps 1160. It should be noted that in addition to the tumble box being rotated, the tumble box is also being shaken from left to right side. Suitably, the shaking of the tumble box 1100 results in a rubbing action of the screen against the skuff so that more of the resins 2100 are dislocated and provided to the steel traps. FIGS. 3C and 3D illustrate further quarter turns of the tumble box and a corresponding increase in collected resin. In one embodiment, a timer is set so that the box 1100 runs for one to two hours.

Figure 4:
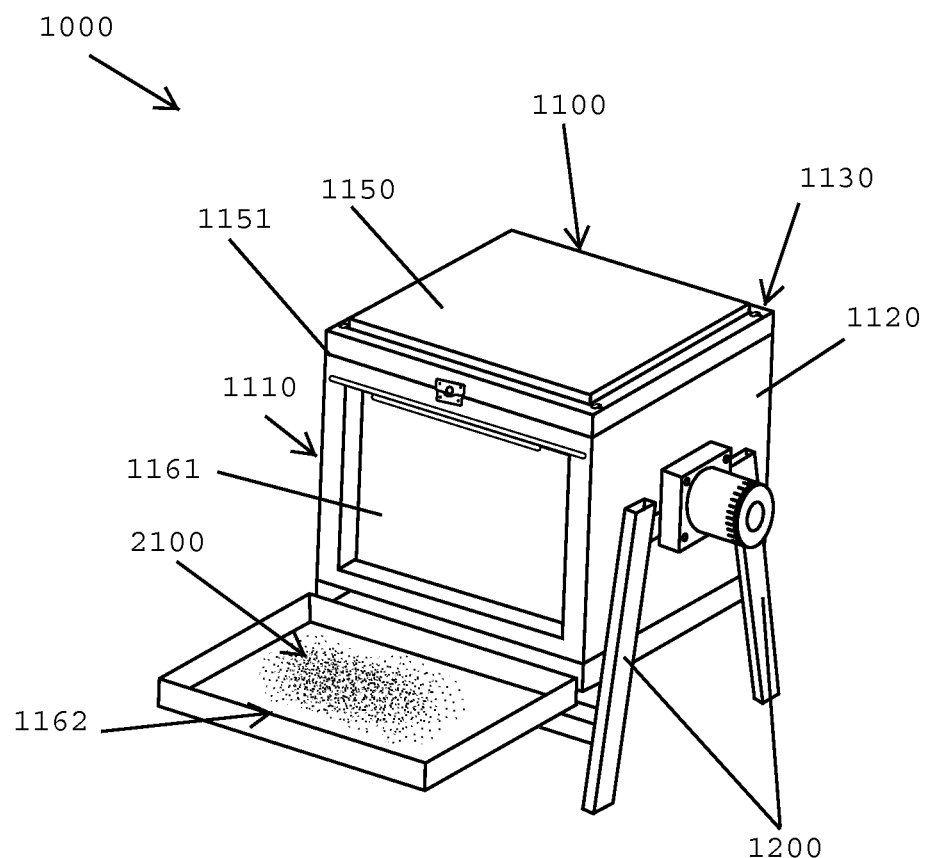
FIG. 4 is a perspective view of the apparatus 1000 with the screen trap 1160 opened; and, It is to be noted, however, that the appended figures illustrate only typical embodiments of the disclosed apparatus and methods, and therefore, are not to be considered limiting of their scope, for the disclosed apparatus and methodologies may admit to other equally effective embodiments that will be appreciated by those reasonably skilled in the relevant arts. Also, figures are not necessarily made to scale.

In one mode of operation, skuff may be provided to within the tumble box 1100, the motor 1300 may be energized so that the box rotates or shakes, wherein rotating and shaking the box 1100 passes resins through the screen traps 1160, and wherein the resins may be extracted via opening the screened traps 1160. FIG. 4 illustrates an other perspective of the tumble box 1100 with screen trap 1160 of the front side 1120 opened to reveal collected resin 2100 and the screen 1161 on the front side 1120 of the tumble box 1100. As shown, the figure depicts extraction of any collected resin from the tumble box 1100. In one embodiment, the collection pan 1162 of the screen trap 1160 is snap-fit over the screen 1161 of any of the front, back, top or bottom walls. After a sufficient amount of resin 2100 is collected in the screen traps, the screen traps 1160 may suitably be opened by unsnapping the collection pan 1162 and gathering any resin disposed therein. Preferably, screen traps 1160 are opened while occupying a bottom, front, or back position so that collected resin will not be lost during opening of the screen traps 1160. Once the resins have been collected, the skuff 2000 can be put through a second cycle, but much less resin will be collected. After the second cycle the skuff can be extracted from the box and replaced with new skuff.

Once a sufficient amount of resin has been collected hash may be produced via compressing the collected resin. In one embodiment, the resin is placed in a vessel and pressure is applied with a vise or hydraulic press. Once compressed, a brick of hash may result.

The disclosed apparatus may be constructed of any suitable materials and methodologies known for resin collectors. It should be noted that FIGS. 1 through 4 and the associated description are of illustrative importance only. In other words, the depiction and descriptions of the present disclosure should not be construed as limiting of the subject matter in this application. Additional modifications may become apparent to one skilled in the art after reading this disclosure. It should be noted that although this disclosure is made with reference to collecting resin from cannabis plant resins, the apparatus and related methods may be used for collecting any resins of any plants.

I claim:

1. An apparatus for collecting resins from plants comprising:
   a tumble box defined by six orthogonal sides;
   a first screen trap defined in a first wall of the box;
   a second screen trap defined in a second wall of the box; and,
   a motor for spinning the tumble box.

2. The apparatus of claim 1 wherein left and right sides of the tumble box are rotatably secured to an A-frame by placement of an axis of the tumble box in bushings.

3. The apparatus of claim 2 wherein the motor is secured to the A-frame and a drive shaft of the motor is coupled to the axis.

4. The apparatus of claim 1 wherein the screen trap is further defined by a collection pan on the outside of the box.

5. The apparatus of claim 1 wherein the motor is further configured to shake the tumblebox.

6. A method of extracting resin from a plant comprising the steps of:
   placing skuff in a tumble box defined by six orthogonal sides, a first screen trap defined in a first wall of the box, and a second screen trap defined in a second wall of the box; and,
   turning the tumble box with a motor.

7. The method of claim 6 wherein the screen trap is further defined a collection pan on the outside of the box.

8. The method of claim 6 wherein the tumble box is defined by at least four screen traps.

9. The method of claim 6 wherein the step of rotating the tumble box is at a revolution per minute in the range of twenty to forty.

10. The method of claim 6 wherein the step of rotating the tumble box lasts for a time in the range of one to two hours.

11. The method of claim 6 further comprising the step of shaking the tumble box.

* * * * *